Patented Aug. 19, 1952

2,607,807

UNITED STATES PATENT OFFICE 2,607,807

PREPARATION OF ALCOHOLS FROM CARBOXYLIC ACIDS

Thomas A. Ford, Mill Creek Hundred, Del., assignor to E. I. du Pont de Nemours & Company, Wilmington, Del., a corporation of Delaware No Drawing. Application February 24, 1950, Serial No. 146,150

5 Claims. (Cl. 260—638)

1

This invention relates to hydrogenation processes and more particularly to the preparation of alcohols by the catalystic hydrogenation of carboxylic acids.

Alcohols represent an important class of industrial chemicals. In recent years the higher alcohols have attained considerable importance as intermediates for the synthesis of soapless soaps, detergents, wetting agents, and the like. These higher alcohols are made on a commercial scale by an indirect method which consists in reducing an ester of the acid corresponding to the alcohol with metallic sodium in anhydrous alcohol. This method is expensive and since it involves the use of metallic sodium it is hazardous. Moreover, the method is of limited applicability since it is restricted to esters. These shortcomings have focused attention on catalytic routes to alcohols, especially to high molecular weight alcohols. W. A. Lazier in U. S. Patent 1,839,974 discloses a successful synthesis of alcohols from carboxylic acids through the employment of chromites of metals forming difficultly reducible oxides as catalysts. Although this method represents a marked forward step, yet it is not completely satisfactory because the catalyst is not as rugged as is desired and because of the very high temperature requirements of the reaction.

It is an object of this invention to provide a process for the preparation alcohols from carboxylic acids. Another object is to provide a process for the catalytic hydrogenation of unsubstituted aliphatic carboxylic acids to unsubstituted aliphatic alcohols in good yields at relatively low temperatures. Other objects will appear hereinafter.

The objects of this invention are accomplished by the following process of preparing aliphatic alcohols which comprises reacting hydrogen with an unsubstituted aliphatic carboxylic acid in the liquid phase and in the presence of a ruthenium-containing hydrogenation catalyst, the hydrogen being the sole component of the reaction mixture capable of reacting with the carboxylic acid. It has now been found that ruthenium catalysts selectively catalyze the hydrogenation of carboxylic acids to the corresponding alcohols in high yields, and that the temperature requirements of the reaction are lower than with hitherto used catalysts.

In a preferred embodiment, a pressure reactor is charged with the carboxylic acid and ruthenium catalyst. Any traces of oxygen in the reaction system are removed either by evacuation or by purging with oxygen-free nitrogen.

2

The reactor is then closed, placed in a rocker mechanism, pressured with hydrogen and heated with agitation. After reaction is complete, as evidenced by cessation of hydrogen absorption, the reactor is permitted to cool, opened, and the contents discharged and filtered to remove the catalyst. The desired alcohol is isolated by distillation or other means known to those skilled in the art.

The examples which follow are submitted to illustrate and not to limit this invention.

Example I

A 400-ml. shaker tube was charged with 100 g. of acetic acid, 100 g. of carbon dioxide and 3 g. of ruthenium dioxide. The reaction vessel was cold-pressured to 450 atm. with hydrogen, and the mixture was heated at 250° C. for 10 hours while hydrogen was added as required to maintain the pressure at 600–800 atm. The reactor was allowed to cool, opened, and the contents discharged and filtered to remove the catalyst. Precision distillation of the filtrate gave the following:

A. 13 cc. of ethyl acetate–ethanol–water, boiling point 70–71° C.
B. 6 cc. of intermediate, boiling point 71–77° C.
C. 40 cc. of ethanol-water azeotrope, boiling point 77–78° C.
D. 5 cc. of intermediate, boiling point 78–99° C.
E. 75 cc. of water-acetic acid, boiling point 99–106° C.

The latter (E) was found to contain about 10 g. of acetic acid by titration.

Example II

Into a 400-ml. shaker tube was put 120 g. (2.0 moles) of glacial acetic acid and 1.8 g. of finely divided commercial grade ruthenium dioxide. The mixture was pressured with hydrogen and shaken at 147–170° C. under 700–950 atm. total pressure for 10 hours. Distillation of the filtered product resulted in the recovery of ethanol as its aqueous azeotrope in 88% conversion.

Example III

Example II was repeated with 3.6 g. of ruthenium-on-charcoal catalyst. There was obtained 58.2 g. of ethanol, 2.9 g. of ethyl acetate and 33.3 g. of water containing 0.1 g. acetic acid.

Example IV

A 400-ml. shaker tube was charged with 120 g. (2.0 moles) of glacial acetic acid, 5.6 g. (0.10 mole) of potassium hydroxide and 1.8 g. of ruthenium dioxide catalyst. This reaction mixture was shaken and heated at 200° C. under 200 atm. of hydrogen pressure for 4.5 hours. Fractionation of the filtered product resulted in the isolation of ethanol in 41% conversion and ethyl acetate in 17% conversion.

*Example V*

A 400-ml. shaker tube was charged with 252 g. (2.0 moles) of oxalic acid dihydrate and 3.8 g. of ruthenium dioxide catalyst. This mixture was heated with shaking at 94–170° C. under 630–990 atm. of hydrogen pressure for 10.5 hours. Fractional distillation of the filtered product resulted in the recovery of ethylene glycol in 47% conversion. Ethanol was a by-product.

*Example VI*

A 400-ml. shaker tube was charged with 118 g. (1.0 mole) of succinic acid and 1.8 g. of ruthenium dioxide catalyst. This mixture was heated with shaking at 152–192° C. under 720–950 atm. of hydrogen pressure for 4–5 hours. By fractionating the filtered product, tetramethylene glycol was obtained in 59% conversion. By-products of the reaction included propanol and butanol.

The examples have illustrated certain specific preferred conditions of temperature, pressure, catalyst concentration, etc. It is to be understood, however, that these are all interdependent variables and that variation of one often requires compensating adjustments in the others.

In the practice of this invention, any ruthenium-containing catalyst can be employed. Examples are elementary ruthenium, ruthenium oxides such as the sesquioxide, dioxide, and tetraoxide, salts of ruthenium such as barium perruthenite, sodium perruthenite, etc.; ruthenates such as sodium, potassium, barium, silver, calcium, strontium, and magnesium ruthenates, etc.; perruthenates such as potassium and sodium perruthenates, etc.; ruthenium halides such as ruthenium dichloride, ruthenium trichloride, ruthenium tetrachloride, ruthenium pentafluoride, etc.; ruthenium chloro salts such as potassium chloro perruthenate, etc.; ruthenium sulfides such as ruthenium disulfide and trisulfide, etc.; ruthenium sulfate, etc. The preferred ruthenium catalysts are elementary ruthenium and the ruthenium oxides because of the superior results in point of yield obtained therewith.

Optimum results are obtained in batch operation when the ruthenium catalyst is in finely divided form. When it is desired to employ very low catalyst concentrations, it is advisable to extend the ruthenium on a support such as charcoal, alumina, kieselguhr, etc. Such supported catalysts may be prepared by the method disclosed in U. S. Patent 2,079,404, or by other methods involving reduction of a compound of ruthenium in the presence of a carrier substance.

The amount of ruthenium catalyst, calculated as the dioxide, can vary between 0.5% and 10% by weight of the carboxylic acid being hydrogenated. Since good reaction rates with good yields of desired alcohol, are obtained employing from 1–5% of ruthenium catalyst, calculated as the dioxide, by weight of the carboxylic acid, that is the amount which is generally used.

The process of this invention is operated under superatmospheric pressures of at least 200 atmospheres. As a rule, however, better reaction rates are attained employing pressures in excess of 500 atm. The use of pressures in excess of 1500 atm. does not appear to have any advantage and that therefore constitutes the practical upper limit of pressure usefully employable.

In general, temperatures in the range of 90–300° C. may be employed in the hydrogenation. Since optimum results from the standpoint of reaction rates and yield of desired alcohol are obtained within the range of 120–200° C., this constitutes the preferred temperatures of operation.

The process may be operated as a batch or as a semicontinuous or continuous operation.

In general, the hydrogenation is effected in the absence of a solvent or diluent; but, if desired, an inert medium such as water or hydrocarbons can be employed.

The process of this invention makes it possible to convert any unsubstituted aliphatic mono- or dicarboxylic acid to an alcohol. By unsubstituted aliphatic mono- or dicarboxylic acid is meant any aliphatic carboxylic acid containing from 1 to 2 carboxyl groups and which, except for the oxygen of the carboxyl group, is wholly hydrocarbon. Examples of suitable acids are acetic, propionic, isobutyric, caproic, caprylic, lauric, myristic, stearic, arachidic, cerotic, oleic, linoleic, beta-eleostearic, crotonic, undecylenic, succinic, adipic, sebacic, oxalic, and the like. Thus the alcohols obtained from these acids are as follows: ethanol from acetic acid, n-propyl alcohol from propionic acid, isobutyl alcohol from isobutyric acid, n-hexyl alcohol from caproic acid, n-octyl alcohol from caprylic acid, lauryl alcohol from lauric acid, myristyl alcohol from myristic acid, octadecyl alcohol from stearic, oleic, linoleic and beta-eleostearic acids, eicosyl alcohol from arachidic acid, ceryl alcohol from cerotic acid, n-butyl alcohol from crotonic acid, undecyl alcohol from undecylenic acid, tetramethylene glycol from succinic acid, hexamethylene glycol from adipic acid, decamethylene glycol from sebacic acid, and ethylene glycol from oxalic acid. If desired, mixtures of acids may be processed to produce mixtures of alcohols, and suitable mixtures are those obtained by hydrolysis of naturally occurring oils and fats.

The process of this invention represents a marked improvement over previously used methods because it makes possible the direct conversion of aliphatic carboxylic acids to the corresponding alcohols in high yields and with minimum of by-product formation at low temperatures.

As many apparently widely different embodiments of this invention may be made without departing from the spirit and scope thereof, it is to be understood that this invention is not limited to the specific embodiments thereof except as defined in the appended claims.

I claim:

1. A process for the preparation of an aliphatic alcohol which comprises reacting hydrogen with an unsubstituted aliphatic carboxylic acid, in the liquid phase under a pressure of at least 200 atmospheres at a temperature within the range of 90 to 300° C. and in contact with a ruthenium-containing hydrogenation catalyst, said hydrogen being the sole component of the initial reaction mixture capable of reacting with said carboxylic acid and separating an aliphatic alcohol from the reaction mixture.

2. A process for the preparation of an aliphatic alcohol which comprises reacting hydrogen with an unsubstituted aliphatic monocarboxylic acid, in the liquid phase under a pressure of at least 200 atmospheres at a temperature within the range of 90 to 300° C. and in contact with a ruthenium-containing hydrogenation catalyst, said hydrogen being the sole component of the initial reaction mixture capable of reacting with said monocarboxylic acid, and separating an aliphatic alcohol from the reaction mixture.

3. A process for the preparation of ethanol which comprises reacting hydrogen with acetic acid, in the liquid phase under a pressure of at least 200 atmospheres at a temperature within the range of 90 to 300° C. and in contact with a ruthenium-containing hydrogenation catalyst, said hydrogen being the sole component of the initial reaction mixture capable of reacting with said acetic acid, and separating ethanol from the reaction mixture.

4. A process for the preparation of ethanol which comprises reacting hydrogen with acetic acid, in the liquid phase under a pressure of at least 200 atmospheres at a temperature within the range of 90 to 300° C. and in contact with a ruthenium dioxide hydrogenation catalyst, said hydrogen being the sole component of the initial reaction mixture capable of reacting with said acetic acid, and separating ethanol from the reaction mixture.

5. In a process for the preparation of ethanol from acetic acid, the improvement which comprises reacting hydrogen with acetic acid in the liquid phase under a pressure of 500 to 1500 atmospheres at a temperature of 120 to 200° C. and in contact with a ruthenium oxide hydrogenation catalyst, said hydrogen being the sole component of the initial reaction mixture capable of reacting with said acetic acid, and separating ethanol from the reaction mixture.

THOMAS A. FORD.

REFERENCES CITED

The following references are of record in the file of this patent:

UNITED STATES PATENTS

| Number | Name | Date |
|---|---|---|
| 1,839,974 | Lazier | Jan. 5, 1932 |
| 2,079,404 | Harris | May 4, 1937 |
| 2,322,095 | Schmidt | June 15, 1943 |
| 2,456,633 | Haensel | Dec. 21, 1948 |
| 2,478,261 | Frank | Aug. 9, 1949 |
| 2,487,054 | Howk | Nov. 8, 1949 |